Feb. 9, 1932.  L. M. LOFTIN  1,844,775
MACHINE FOR SHARPENING SAW TEETH
Filed Aug. 14, 1930    2 Sheets-Sheet 2
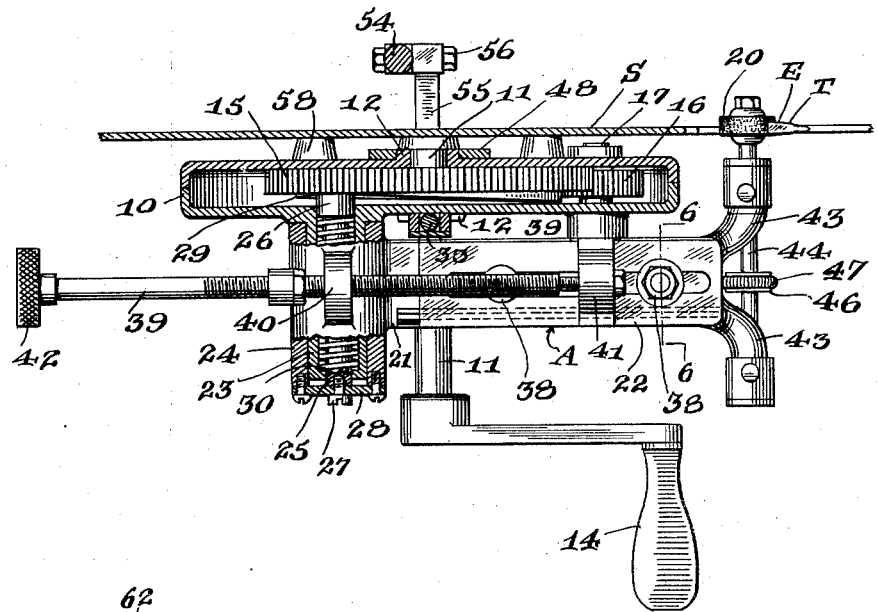
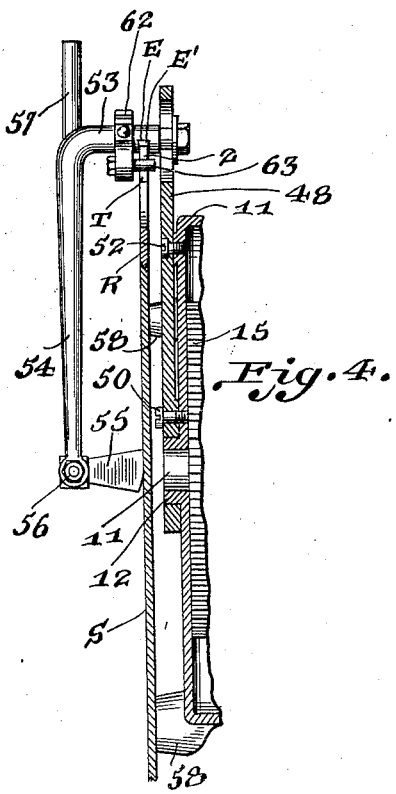
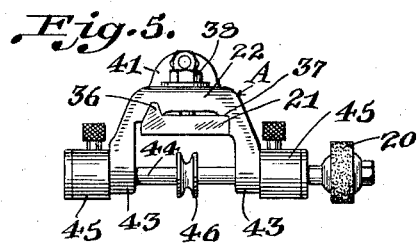
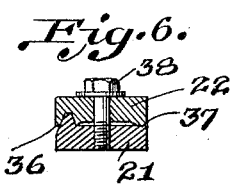
Inventor
Lee M. Loftin
By
Hubert Nick  Attorney Patented Feb. 9, 1932

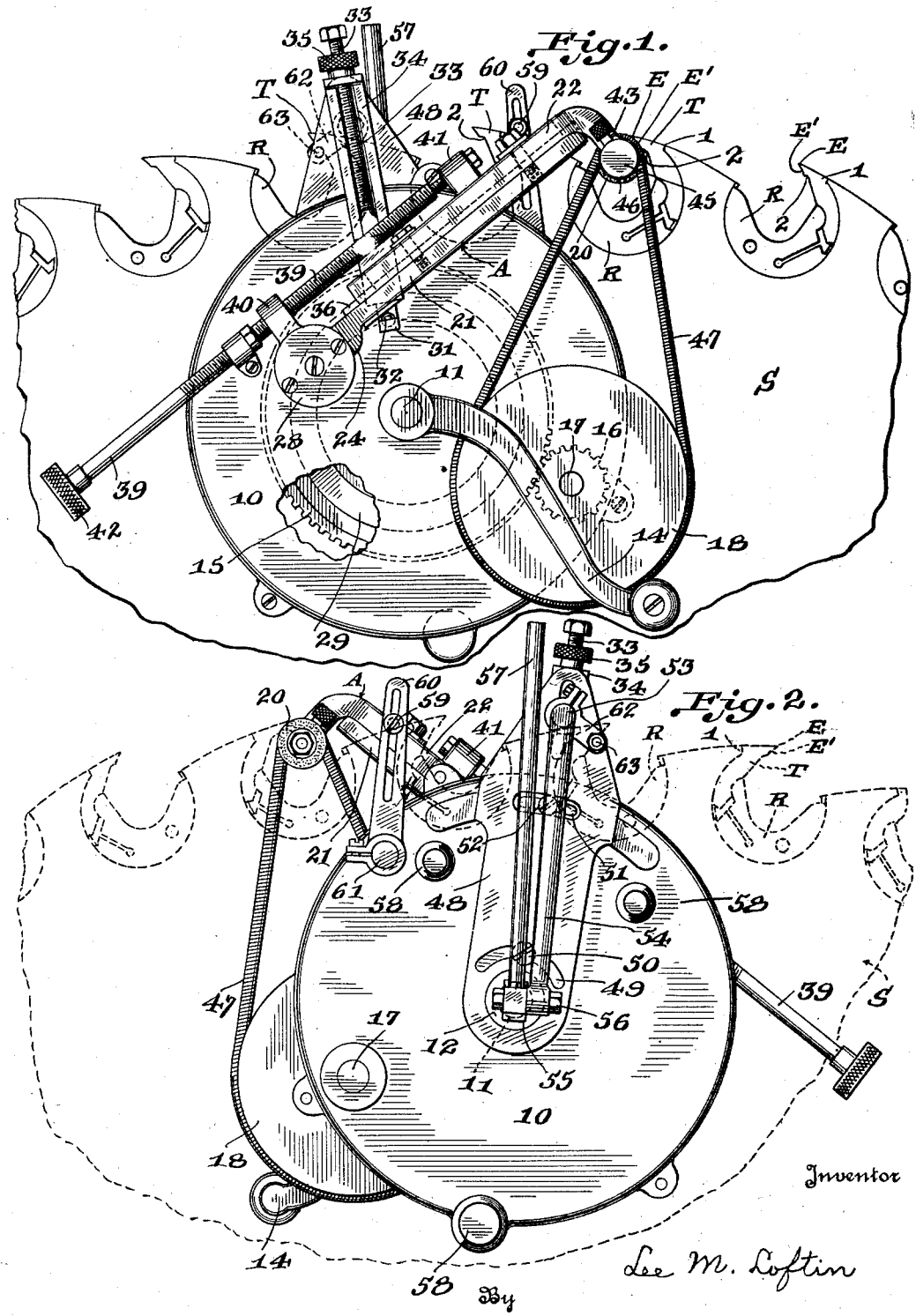

1,844,775

UNITED STATES PATENT OFFICE

LEE M. LOFTIN, OF OXFORD, NORTH CAROLINA

MACHINE FOR SHARPENING SAW TEETH

Application filed August 14, 1930. Serial No. 475,285.

This invention relates to certain improvements in machines for sharpening saw teeth; and the nature and objects of the invention will be readily recognized and understood by those skilled in the art in the light of the following explanation and detailed description of the accompanying drawings illustrating what I at present consider to be the preferred embodiment or mechanical expression of my invention from among various other forms, arrangements, embodiments, combinations and constructions of which the invention is capable within the spirit and the scope thereof.

The invention presents a portable type of saw tooth grinding and sharpening machine which includes a rotary grinding wheel, for mounting and positioning on and supported by a saw blade with the rotary grinding wheel positioned for sharpening a saw tooth, such as the type of portable saw tooth sharpening machine disclosed in my pending United States patent application filed May 31, 1930, Serial No. 458,642; and a main and general object of my instant invention is to materially improve the type of machine of my aforesaid pending application so as to increase the efficiency thereof to secure more accurate sharpening of the teeth of a saw, while at the same time simplifying such machines structurally and mechanically.

Another object of the invention is to provide a mounting arrangement for such a machine by which it can be more easily and quickly mounted on a saw blade and moved and positioned from tooth to tooth thereon, which arrangement enables the machine to be positively located to accurately position the rotary grinding wheel with respect to a tooth to be sharpened, and by which displacement of the grinding wheel from proper alignment with a saw tooth being sharpened is practically eliminated to insure the desired degree and accuracy of the grinding and sharpening of the saw teeth.

Another object of the invention is to provide a mechanically simple arrangement for reciprocating the rotary grinding wheel back and forth and transversely across a saw tooth in grinding and sharpening the same, by which the entire grinding wheel supporting and carrying arm together with the grinding wheel mounted and carried thereon is reciprocated as a unit directly from the grinding wheel driving and rotating mechanism.

A further object of the invention is to provide accurate and readily operated mechanisms for adjusting the grinding machine to position the same on various types and sizes of saw blades and saw teeth spacings of such blades, as well as for accurately adjusting and positioning the rotary grinding wheel to meet the sharpening and grinding requirements for the particular saw teeth to be sharpened; and further to provide such mechanisms of a construction and arrangement such as to reduce the possibility of their desired settings and adjustments when once made, being disturbed or deranged in the operation of the machine and in moving the machine from tooth to tooth in sharpening the teeth of a saw.

Another object of the invention is to provide an arrangement for mounting and supporting the sharpening machine on a saw blade and positioning the rotary grinding wheel in sharpening position with respect to the tooth to be sharpened, through the medium of a positioning member carried by the machine and engaged with the throat of a tooth adjacent the tooth to be sharpened so as to properly and accurately locate the machine and enable mounting of the same from tooth to tooth on the saw to accurately secure the same positioning of the machine and grinding wheel for each tooth without readjusting the machine for each tooth to be sharpened.

Another object of the invention is to provide a machine embodying the above enumerated objects and results, which will be compact, of relatively light weight yet capable of withstanding the conditions to which subjected in use, and of a simple construction capable of efficient operation with a minimum of maintenance, and further which can be efficiently operated by unskilled labor to produce accurate saw teeth sharpening.

With the foregoing objects and results in view, as well as certain others arising from features of the invention hereinafter described and explained, the invention consists in certain novel features in construction and in combinations and arrangements of parts as will be more fully and particularly referred to and specified hereinafter.

Referring to the accompanying drawings, in which similar reference characters refer to corresponding parts throughout the several figures thereof:

Fig. 1 is a view in side elevation of a saw tooth sharpening machine embodying my invention, in operative adjusted position on a rotary saw, a portion only of the saw being shown with the rotary grinding wheel in operative tooth sharpening position.

Fig. 2 is a view in side elevation of the machine mounted on a saw, but taken from the opposite side of the machine from that of Fig. 1, and showing particularly the adjustable supporting and positioning mechanism and the clamp for releasably securing the machine in position on the saw blade.

Fig. 3 is a transverse vertical section through the machine casing taken in a plane above but substantially parallel to the reciprocating grinding wheel carrying arm and showing such arm in top plan.

Fig. 4 is a detail vertical section through a portion of the casing of the machine and saw blade on which mounted, showing particularly the arrangement of adjustable saw blade engaging and machine supporting members together with the clamp for releasably securing the machine in position on the saw blade.

Fig. 5 is a view in end elevation of the grinding wheel and wheel shaft carrying head of the reciprocating arm of the machine.

Fig. 6 is a transverse section through the extensible grinding wheel carrying and reciprocating arm, taken on the line 6—6 of Fig. 3.

One form and embodiment of a machine expressing the several features of the invention is illustrated in the drawings as operatively mounted in saw tooth sharpening position on a saw S of the rotary wood cutting type having a series of saw tooth receiving recesses spaced therearound and formed in the periphery of the saw blade in the usual manner for such types of saws. A curved saw tooth or bit T is mounted and removably inserted and held in position in each recess by a curved member or ring R, in a manner familiar in the art, with each saw tooth T curved or extended inwardly a distance across its recess in the direction of saw rotation, and terminating at its forward outer end in a transverse cutting or chisel-like edge E having a beveled under face or surface E' (see Figs. 1 and 2). Each tooth T in the type thereof here shown is formed with a shoulder 1 on the outer side thereof which abuts against and engages the adjacent edge of the saw blade at the outer side of the recess in which mounted to hold the tooth against displacement, in a manner understood in the art, and each tooth T is also formed with and provides a throat 2 or curved inner edge portion adjacent the cutting edge T and beveled under face E' thereof, as will be clear by reference to Figs. 1 and 4 of the drawings in particular.

While a rotary wood saw of the inserted tooth type as described above is here illustrated, it is to be clearly understood that the invention is not limited or restricted to a machine for grinding and sharpening the teeth of saws of this type, as a machine of the invention, such as the form thereof here shown, is intended for and adapted to mounting on and sharpening the teeth of reciprocating saws, band saws and other types, as well as rotary saws, and to rotary and other types of saws having integral teeth or other forms of inserted teeth. The type of rotary, inserted tooth saw S here shown, is selected because it presents the conditions and difficulties surrounding tooth sharpening which the machine of the invention is designed to overcome, in a marked degree.

In accordance with the invention a portable machine is provided for removable mounting on the saw S to position the rotary grinding wheel of the machine within the saw tooth recess of that tooth T of the saw to be sharpened so as to accurately grind the tooth under surface E' (see Fig. 1) to sharpen the tooth cutting edge T, and which machine is moved from tooth to tooth around the saw to successively sharpen the saw teeth T thereof. In the illustrated embodiment of such a machine, it includes a substantially flat, disc-like circular casing 10 within which the driving gearing for the rotary and reciprocatory grinding wheel is housed, and which casing 10 forms the base and support for the various mechanisms and structures making up the machine. The main driving shaft 11 of the machine is mounted extending axially through casing 10 and journaled in alined exteriorly extended opposite side bearing bosses or hub members 12. Shaft 11 at the outer or front operating side of casing 10 extends outwardly a distance therefrom and at the outer end thereof an operating crank handle 14 is fixed thereto for rotating shaft 11, while the opposite end of shaft 11 at the saw blade side of casing 10 terminates at and within the bearing boss 12 therefor (see Figs. 3 and 4). The main driving gear 15 is fixed on the shaft 11 within the housing for rotation by and with such shaft, and gear 15 engages and meshes with a pinion 16 within the casing mounted on a shaft 17 journaled in suitable bearings in the casing opposite walls and located adjacent the outer lower side of the casing, as will be clear by reference to Figs. 1 and 2. The shaft 17 is extended outwardly from the casing at the front or operating side thereof, and a belt pulley 18 is fixed thereon for rotation thereby, such pulley being disposed between the casing and the plane of rotation of crank handle 14, as shown by Figs. 1 and 2 of the drawings. Thus, by rotating crank handle 14, the pulley 18 is rotated through pinion 16 and driving gear 15 meshed therewith.

The rotary grinding wheel 20 by which the saw teeth are ground and sharpened, such wheel 20 being formed of emery or such like grinding wheel material, is mounted and carried on the outer end of a laterally reciprocating and vertically adjustable extensible arm A which consists of the inner lower section 21 and the outer upper section 22 slidably mounted for longitudinal movement on section 21, with the wheel 20 carried by the outer end of section 22. A tubular stub shaft 23 is fixed to, in the present instance formed integral with, and extends horizontally from the front wall of casing 10 at a point thereon spaced slightly above shaft 11 on the opposite side thereof from pulley 18, referring now to Fig. 3 of the drawings in particular, and the inner end of section 21 of arm A is formed with an enlarged transversely disposed hub portion 24 having an axial open ended bore therethrough, which slidably and swingably fits over and is received on the stub shaft 23.

A pin 25 is mounted in and extending axially through stub shaft 23 for reciprocation axially thereof, pin 25 being slidably mounted at its outer end in the shaft end wall and at its inner end formed with an enlarged head 26 slidably fitting the bore of shaft 23 and extended inwardly into the casing to the side of main driving gear 15. (See Fig. 3.) The outer end of pin 25 is secured to hub member 24 of arm A by a machine screw or the like 27 extending through a removable end plate 28 fixed to the outer end of hub members 24, so that the arm A and pin 25 are reciprocable on stub shaft 23 longitudinally thereof toward and from the casing 10. The main driving gear 15 is provided with an annular cam 29, still referring to Fig. 3, on the side thereof adjacent head 26 of pin 25 and in line with head 26 which bears there against. Cam 29 is formed with a high side and a low side, substantially diametrically opposite, and a coil expansion spring 30 is mounted within shaft 23 around pin 25 under compression between outer end wall of shaft 23 and pin head 26. The spring 30 maintains pin head 26 pressed into engagement with cam 29 for outward reciprocation against the spring when the high side of the cam engages the pin head, and forces the pin with arm A inwardly on shaft 23 as the low side of the cam engages head 26.

The arm A is supported and maintained in the desired vertical position to locate grinding wheel 20 at the outer end thereof in the required position, by a vertically disposed bracket comprising an outwardly disposed arm 31, extended below arm A and provided with a roller or ball 32 on the upper side thereof on which arm A loosely rests and over which it is reciprocable, and the upwardly extended rod 33 fitted in a vertically disposed guide frame 34 fixed to and extending upwardly from the casing 10 spaced from the inner side of arm A. The upper end of rod 33 extends slidably through the outer end of frame 34 and is externally threaded to receive the nut 35 which loosely rests upon the frame upper end. By rotating nut 35, rod 33 is raised or lowered to raise or lower arm 31 and raise or lower grinding wheel carrying arm A, which swings on shaft 23 as an axis. The foregoing arrangement is clearly shown in Fig. 1 of the drawings.

The arm A formed of sections 21 and 22 is adjustable in length to further properly position and locate the grinding wheel 20 mounted at the outer end thereof. Lower section 21 is formed with a longitudinal V-shaped rib 36 on the upper side along and adjacent one edge (the outer) thereof, which fits into a corresponding groove in the under side of upper section 22, and upper section 22 is longitudinally channeled to provide a flat faced rib 37 along the opposite edge thereof which bears upon the upper side of lower section 21, all as clearly shown by Figs. 5 and 6 of the drawings. The section 22 is suitably longitudinally slotted to receive the spaced screws 38 which extend therethrough into the lower section 21 and slidably confine the sections together. By the construction and arrangement of sections 21 and 22 any wear resulting from sliding section 22 on section 21 to adjust the length of arm A is evenly taken up and lateral misalignment or lateral tilting of one section on the other is prevented.

Adjustment of the length of arm A is made by adjusting mechanism, referring to Figs. 1 and 3 in particular, which comprises a rod 39 threaded forwardly through an ear 40 on the upper side of hub member 26 of lower arm section 21, and extending forwardly to and rotatably secured in an ear 41 on the upper side of upper arm section 22. The lower outer end of rod 39 is formed with a knurled operating head or handle 42 for rotating the same. By rotating rod 39, the upper arm section 22 can be slid outwardly or inwardly on lower section 21 and the length of arm A adjusted to properly position the outer grinding wheel carrying end thereof.

The grinding wheel 20 is rotatably mounted at and carried by the outer end of upper section 22 of arm A, referring to Fig. 5 of the drawings in particular, through the medium of the downwardly and outwardly extending and diverging arms 43 at the end of section 22. A grinding wheel shaft or spindle 44 is mounted extending across and between the outer ends of arms 43 and is journaled in suitable anti-friction bearings 45 carried by the arms respectively, the spindle in the example hereof being extended through the ends of arms 43. The shaft or spindle 44 is positioned by arm A spaced outwardly from and transversely with respect to casing 10, and extends across the casing at one end to the position of the saw blade with the grinding wheel 20 secured on such end of the spindle for rotation therewith and thereby. A pulley 46 is fixed on spindle 44 intermediate the arms 43 and substantially in line with the driving pulley 18 therebelow on casing 10. An elastic or spring belt 47 is placed under tension around and between pulleys 18 and 46 for rotating spindle 44 and the grinding wheel 20. This elastic belt 47 further functions to swing arm A downwardly and maintain the same in operative and adjusted position on the supporting arm 31 in contact with the ball or antifriction member 32 thereon for reciprocation thereover.

With the machine arranged as above described, rotation of crank handle 14, rotates driving gear 15, which in turn rotates pinion 16 and pulley 18, and through belt 47 pulley 46 is rotated to drive spindle 44 and rotate the grinding wheel 20. As gear 15 rotates the cam 29 thereon in engagement with pin head 26, reciprocates pin 25 and hub 24 on shaft 23, together with arm A and grinding wheel 20 as a unit, during and while grinding wheel 20 is rotated by spindle 44. Preferably, crank handle 14 is arranged on shaft 11 with respect to cam 29 of gear 15, so that, as the handle swings by and passes the outer end of arm A, the low side of the cam is engaging pin 25 and the arm A is in position moved inwardly toward the casing. The arrangement of the pulleys 18 and 46 in substantial alinement, (the distance of arm reciprocation being relatively small) and directly below and substantially in the plane of the longitudinal center of the arm A, is such that the force or pull exerted by belt 47 at the outer end of arm A is along the longitudinal center of the arm, so that any tendency to twist or displace the arm laterally is done away with and maintenance of the grinding wheel 20 in true desired adjusted position is insured.

As an important feature thereof the invention provides for the mounting and supporting of the sharpening machine on a saw blade to position the grinding wheel 20 for sharpening engagement with a saw tooth. In carrying out this feature of the invention by the illustrated example hereof, the machine is supported in position with the casing 10 vertically disposed at and parallel to one side of the saw blade, such as the blade of saw S here shown. The supporting mechanism embodies the bracket plate 48 mounted for adjustment on and around shaft bearing 12 of shaft 11 on the saw blade side of casing 10, and extending radially and upwardly therefrom a distance beyond and above casing 10 and saw S. The bracket plate 48 is provided with an arcuate slot 49, referring here to Fig. 2 of the drawings, adjacent its inner end through which a headed screw 50 extends and is fixed to the casing to confine the plate on member 12 against displacement, while an adjusting slot 51 is provided through the plate adjacent the upper side of casing 10 with a headed screw 52 extended therethrough and engaged in casing 10. By loosening screw 52, bracket plate 48 can be swung in either direction on member 12 to the desired adjusted position and again secured by screw 52. A support bar 53, referring to Figs. 2 and 4 of the drawings, is secured in the upper end of plate 48 and extends laterally and outwardly therefrom above and transversely of the saw S, and bears and rests upon the edge of the saw S to support the machine in position on the saw.

The bar 53 extends a distance outwardly from plate 48 beyond saw S and then is bent downwardly and depends at substantially right angles therefrom to form the arm 54 spaced outwardly a distance from casing 10 and the saw S and terminating with its inner, lower end substantially opposite the center of the casing 10. A clamping block 55 is pivotally or swingably mounted on a pin 56 in the lower end of arm 54 and extends inwardly toward and at substantially right angles to the saw S. The clamping block is swung by means of a hand lever 57 (see Fig. 4) downwardly to position bearing against the saw blade to clamp the blade between casing 10 and clamping block 55, or upwardly and outwardly to position disengaged from the blade for release and removal of the sharpening machine as a unit from mounted position on the saw. In order to secure the desired position of casing 10 against displacement from clamped position, the side thereof adjacent saw S is provided with the spaced positioning abutments 58 thereon which bear against the saw blade and hold the casing in desired position with the saw blade engaged by clamping block 55.

A second point of support for the machine is provided by the pin carried by and projecting laterally from an arm 60 which is pivotally adjustably secured and clamped at its inner end on a lug 61 on the exterior of the saw blade side of casing 10, and disposed between plate 48 and the outer end of grinding wheel carrying arm A (see Figs.

1 and 2). The arm 60 extends upwardly beyond the casing 10 and the pin 59 is adjustably secured in a longitudinal slot in the arm to position the spacing of the pin outwardly on this arm. Pin 59 extends transversely across the saw S and rests upon the edge thereof to form a second point of support for the machine, spaced a distance from support bar 53, the outer end of pin 59 being headed to engage the saw blade and prevent the pin slipping laterally from the saw when the machine is loosely supported on the saw upon release of clamping block 55.

The invention provides further for positioning the sharpening machine on a saw S with the grinding wheel 20 located thereon in grinding position engaging the desired saw tooth to be sharpened, from and by the throat 2 of an adjacent tooth. In the example hereof this is accomplished by a bracket 62 clamped on support bar 53 and extending radially from the side of such bar opposite the support pin 59 and outer, grinding wheel carrying end of arm A (see Figs. 1 and 2). The bracket 62 is adjustable around bar 53 to raise or lower the outer end thereof, which carries the laterally projecting positioning pin 63, referring particularly to Fig. 4 of the drawings, which pin is adapted to extend transversely across saw S through a saw tooth recess and to engage in the throat 2 of tooth T of such recess.

The sharpening machine of the invention constructed and arranged in the foregoing manner, is mounted and supported and operatively positioned on the saw S by placing the machine on the saw with the saw blade extending between casing 10 and arm 54, and with the support bar 53 and supporting pin 59 resting on the saw edge at opposite sides of a tooth recess and between such recess and the adjacent teeth recesses, respectively, at opposite sides thereof, referring now to Figs. 1 and 2 of the drawings. The arm A is adjusted as to length and vertical position so as to dispose grinding wheel 20 in the next adjacent tooth recess to the support pin 59, rearwardly with respect to the direction of saw rotation. The positioning pin 63 is disposed in the tooth recess next forwardly adjacent the support bar 53 and is engaged against and in the throat 2 of tooth T of such recess. The grinding wheel carrying arm A is then given its final adjustments to accurately position and engage wheel 20 with the beveled under face T' of the tooth cutting edge T to be sharpened, all parts are then secured in their adjusted positions, and the machine is clamped and locked in position on saw S by engaging clamping block 55 tightly against the saw blade. With the machine in such operative position, firmly and securely held against vertical or lateral movements or displacements, the crank 14 is rotated in the proper direction which causes rotation of grinding wheel 20 and reciprocation thereof by the arm A across the tooth T being sharpened, to result in an accurate sharpening and grinding of the tooth to give the required straight cutting edge T with the slightly hollow ground under surface T'.

Upon completion of the sharpening of the tooth T above described, the machine is unclamped and released from the saw S and moved forwardly on the saw until positioning pin 63 enters the next forward tooth recess, support bar 53 and pin 59 then having moved to positions resting on the saw at opposite sides of the next forward tooth recess, and grinding wheel 20 being moved to sharpening position with respect to tooth T forwardly adjacent the last sharpened tooth. The engagement of pin 63 with the tooth throat 2 will then position grinding wheel 20 for sharpening the tooth T with which engaged, after which the machine is again clamped and the tooth sharpening operation by rotation and reciprocation of grinding wheel 20 is carried out. Due to the positioning of the grinding wheel 20 from the throat 2 of a tooth by the pin 63, as these teeth are all accurately spaced apart and are firmly held against movement by their shoulders 1 in the direction in which pin 63 acts thereon, once the desired adjustments of arm A, pin 63 and saw engaging and machine supports 53 and 59, has been made, the same grinding and sharpening of each tooth on the saw is obtained without the necessity for adjustment of the machine for each tooth. This insures the highly desirable similar sharpening and grinding of each tooth to secure the cutting edges T thereof lying in a true circle around the cutting periphery of the saw.

Thus, the teeth T of a saw can be successively sharpened quickly and accurately by the machine of the invention without removing the saw from normal operative position, or in the case of inserted teeth such as teeth T without removing the teeth from the saw. The machine is quickly mounted on a saw and easily released and secured in the next sharpening postion thereon. The reciprocation of the grinding wheel assures of maintaining a straight tooth cutting edge, and by the arrangement of the invention for reciprocating the grinding wheel carrying arm and grinding wheel as a unit in a straight path eliminates the tendency of the arm or wheel carried thereby to turn or twist from true sharpening alinement. The spaced points of support on the saw afforded by bar 53 and pin 59, together with positioning pin 63, maintain the machine in postion against vertical displacement when the machine is clamped in postion on a saw by clamping block 55, which latter together with abutments 58 securely hold the machine against lateral displacement. By the various adjustments provided for the supporting and positioning members and for the grinding wheel carrying reciprocating arm, the machine is adapted to a wide range of saw sizes and saw tooth spacings. The machine is also mechanically simple and of a compact arrangement rendering it easy to handle and operate with a minimum possibility of mechanical failures in operation under conditions encountered in the use thereof.

It is further evident that various changes, modifications, variations, eliminations, substitutions and additions might be resorted to in expressing the broad features of the invention, and hence I do not wish to limit the invention in all respects to the exact and specific disclosures hereof.

Desiring to protect my invention in the broadest manner legally possible, what I claim, is:

1. A portable saw tooth grinding and sharpening machine for removable mounting on a saw to individually sharpen the saw teeth, comprising a casing for mounting in position at one side of a saw, laterally projecting and adjustable supporting members for engaging over the outer edge of the saw at spaced points thereon between saw teeth to support said casing in position on the saw, a rotary grinding wheel adjustably supported from the casing in postion for sharpening engagement with a saw tooth, means on the casing operatively associated with the grinding wheel for rotating said grinding wheel, and a positioning member adjustably mounted on one of said laterally projecting supporting members for engagement with the throat of a saw tooth spaced from the tooth to be sharpened to locate and position the casing on a saw with the grinding wheel in operative tooth sharpening position.

2. A portable saw tooth grinding and sharpening machine for mounting on a saw to individually sharpen the saw teeth, comprising a casing for mounting at one side of and supported from the saw, an arm mounted on the casing extending outwardly therebeyond, a tooth sharpening grinding wheel rotatably mounted at the outer end of said arm in position for sharpening engaging with a saw tooth, means for rotating said grinding wheel, and means operated by said wheel rotating means for laterally reciprocating said arm and grinding wheel as a unit simultaneously with the rotation of said wheel.

3. A portable saw tooth grinding machine for mounting on a saw to individually sharpen the saw teeth, comprising a casing for mounting at one side of and supported from the saw blade, an arm pivotally mounted at one end thereof on the outer side of the casing for vertical swinging thereof on a horizontal axis to adjust the vertical position of the opposite end of the arm, said arm laterally reciprocable toward and from the casing, adjustable supporting means for the arm spaced from its mounting on the casing, a grinding wheel rotatably mounted at the outer end of the arm on an axis transverse of the arm and the saw with the grinding wheel in vertically disposed position for grinding engagement with a saw tooth and rotation in the plane of the tooth, means for rotating said grinding wheel, and means actuated by the wheel rotating means for reciprocating said arm and grinding wheel as a unit during rotation of the wheel to move the grinding wheel back and forth across a tooth during grinding thereof by rotation of the grinding wheel.

4. In a portable machine for mounting on a saw to grind and sharpen the saw teeth, a casing for mounting at one side of the saw, spaced laterally projecting supporting members for engaging over the edge of the saw to support the casing thereon, a positioning pin projecting laterally from the casing to one side of and spaced from said supporting members and adapted to engage in the throat of a saw tooth to position the casing, a rotary grinding wheel supported from the casing at the opposite side of said supporting members from said positioning pin and disposed substantially in the plane of a saw, the said pin when engaged with the throat of a saw tooth positioning said grinding wheel in operative relation with a saw tooth spaced from the positioning pin engaged tooth, means for reciprocating said grinding wheel, and means for releasably clamping said casing in position on a saw.

5. In a portable machine for mounting on a saw to sharpen the saw teeth, a casing, supporting members adjustably mounted on the casing for engaging the saw to support the casing in position at one side of the saw, a stub shaft projecting laterally from that side of the casing opposite a saw, an arm pivotally and slidably mounted at one end on said shaft and extending upwardly and outwardly therefrom a distance beyond the casing, means adjustably supporting the arm at a point thereon spaced outwardly from said stub-shaft, a rotary grinding wheel mounted at the outer end of said arm for positioning thereby in grinding engagement with a saw tooth, a gear within the casing operatively associated with the grinding wheel for rotating the same, a cam on said gear opposite said stub shaft, a pin slidably mounted axially of said shaft connected at its outer end to said arm and engaged by the cam at its inner end, whereby rotation of said gear to rotate the grinding wheel simultaneously reciprocates said arm and grinding wheel laterally as a unit.

6. In a portable saw sharpening machine for removable mounting on a saw to individually sharpen the saw teeth, in combination, a casing for mounting on and supporting from the saw, spaced laterally projecting supporting members on the casing for engaging over the edge of the saw between spaced saw teeth, a rotary grinding wheel adjustably mounted on and supported from the casing for engagement with a saw tooth to sharpen the same, said grinding wheel vertically disposed for grinding rotation in the plane of the saw tooth transversely of the tooth cutting edge, a positioning member on the casing for engaging in the throat of a tooth spaced from the tooth to be sharpened for positioning the casing to locate the grinding wheel in sharpening engagement with the tooth to be sharpened, means for removably clamping and securing the casing on the saw against displacement from the position determined by said positioning member, and mechanism carried by the casing operatively associated with said grinding wheel for rotating the wheel to grind and sharpen a tooth with which engaged.

7. A portable saw tooth grinding machine for removable mounting on a saw to grind and sharpen the saw teeth, embodying a casing for mounting along one side of and removably supported from the saw blade, a grinding wheel supported from the casing, spaced therefrom and disposed in position with respect thereto such that with the casing mounted on a saw the grinding wheel is disposed substantially within the plane of the saw in grinding engagement with the saw tooth to be sharpened, means carried by the casing operatively associated with the grinding wheel for rotating said wheel, and mechanism for reciprocating said grinding wheel during grinding rotation thereof, back and forth across and transversely of the tooth being sharpened.

8. A saw tooth grinding and sharpening machine for removable mounting on a saw to individually sharpen the saw teeth, embodying a casing for mounting at one side of a saw, means for removably supporting and securing the casing in position on a saw, an arm carried by the casing and extending outwardly therebeyond, a saw tooth grinding wheel rotatably mounted at the outer end of said arm and disposed, with the casing in mounted position at one side of a saw, substantially in the plane of the saw in position for grinding engagement with a saw tooth, and means carried by the casing operatively associated with said grinding wheel for rotating the same in the plane of the tooth transversely of the tooth cutting edge.

9. A saw tooth grinding and sharpening machine for removable mounting on a saw to individually sharpen the saw teeth, embodying a casing for mounting in position disposed at one side of a saw, means for removably mounting and securing the casing in position on and supported from the saw, a rotary grinding wheel, means supporting said grinding wheel from the casing in position disposed substantially within the plane of the saw when the casing is in mounted position on a saw, the said grinding wheel supporting means adjustable to move the grinding wheel to position the wheel in grinding and sharpening engagement with a saw tooth, and mechanism operatively associated with said grinding wheel for rotating the same.

10. A saw tooth grinding machine for removable mounting on a saw to sharpen the saw teeth, comprising a casing for mounting in position disposed at one side of a saw, means for removably mounting and securing the casing in position on and supported from the saw, an arm pivotally mounted on the casing for vertical swinging on a substantially horizontal axis and extending outwardly beyond the casing, a grinding wheel rotatably mounted at the outer free end of said arm in position thereon such that with the casing in mounted position said grinding wheel is disposed substantially in the plane of the saw, means for maintaining said arm in vertically adjusted position with the grinding wheel disposed in grinding engagement with a saw tooth to be sharpened, and mechanism operatively coupled with said grinding wheel for rotating the same.

11. A saw tooth grinding and sharpening machine for removable mounting on a saw to sharpen the saw teeth, embodying a casing for mounting in position on and supported by a saw, an arm pivotally mounted on said casing for vertical swinging and extending outwardly beyond said casing, a grinding wheel rotatably mounted on said arm in such position thereon that with the casing mounted on a saw said grinding wheel is disposed substantially in the plane of the saw, adjustable means supporting said arm in vertically swung position to locate the grinding wheel at a tooth to be sharpened, means for adjusting said arm longitudinally to move the grinding wheel into accurate sharpening engagement with a saw tooth, and mechanism operatively associated with the grinding wheel for rotating said wheel to sharpen a tooth with which engaged.

12. A saw tooth grinding and sharpening machine for removable mounting on a saw to sharpen the saw teeth, embodying a casing for mounting on a saw in position supported along one side of the saw, means on the casing for engaging over the saw and removably securing the casing in position thereon, an arm disposed on the outer side of and extending outwardly beyond the casing, a rotary grinding wheel mounted on the outer end of said arm in position spaced laterally inwardly therefrom and disposed substantially in the plane of the saw for sharpening engagement with a saw tooth, means operatively associated with said grinding wheel for rotating the same, said arm mounted for lateral reciprocation toward and from the casing, and means for reciprocating said arm and grinding wheel as a unit during rotation of the wheel to move the grinding wheel back and forth across the tooth being sharpened.

13. A saw tooth grinding and sharpening machine for removable mounting on a saw to sharpen the saw teeth, embodying a casing for removable mounting on a saw, an arm mounted on the outer side of the casing and extending thereacross and outwardly therebeyond, said arm mounted for lateral reciprocation toward and from the casing, a rotary grinding wheel mounted at the outer end of said arm in such position thereon that with the casing in mounted position on a saw the grinding wheel is disposed substantially in the plane of the saw for grinding engagement with a tooth to be sharpened, a gear within the casing operatively coupled with the grinding wheel for rotating the latter, means for rotating said gear, and means carried by the gear operatively associated with said arm for reciprocating the arm and grinding wheel as a unit during rotation of the grinding wheel.

14. The combination in a portable machine for removable mounting on a saw to sharpen the saw teeth, of a casing for mounting on a saw, a rotary grinding wheel supported from the casing and positioned with respect thereto so that the grinding wheel is disposed in substantially the plane of the saw in grinding engagement with a saw tooth for rotation in the plane of the tooth, said grinding wheel mounted for axial reciprocation, means for rotating the grinding wheel, and means for reciprocating the grinding wheel back and forth across a tooth simultaneously with and during the rotation of the grinding wheel.

15. In a portable saw sharpening machine for removable mounting on a saw to grind and sharpen the saw teeth, a casing for mounting on a saw supported in position thereon vertically disposed along one side of a saw, spaced laterally projecting members at the upper side of the casing for engaging over the upper edge of the saw between saw teeth to support the casing in position, a rotary grinding wheel supported from the casing in position disposed substantially in the plane of the saw for engaging a saw tooth spaced around the saw from said casing supporting members, mechanism carried by the casing operatively associated with said grinding wheel for rotating said wheel to grind and sharpen a tooth, and a laterally projecting positioning pin on the casing spaced from said supporting members at the opposite side thereof from the grinding wheel for engaging in the throat of a saw tooth to position the casing and grinding wheel on the saw and maintain the same against displacement tending to move the grinding wheel toward a tooth being sharpened.

16. A saw sharpening machine for removable mounting on a saw to grind and sharpen the saw teeth, a casing for removable mounting on a saw, a stub shaft projecting laterally from the outer side of the casing, an arm slidably mounted on said shaft and extending radially therefrom outwardly across and beyond the casing, a rotary grinding wheel mounted at the outer end of said arm in position thereon such that with the casing mounted on a saw said grinding wheel is disposed in grinding engagement with the saw tooth to be sharpened, a gear within the casing, means for rotating said gear, transmission means operatively associating said gear with said grinding wheel for rotating the latter, a cam on said gear, and means operatively coupled with said arm and actuated by said cam for laterally reciprocating said arm and grinding wheel as a unit as said gear is rotated to reciprocate said grinding wheel back and forth across the tooth being ground.

17. A saw sharpening machine for removable mounting on a saw to individually sharpen the saw teeth, embodying a casing for mounting at one side of and supported from the saw blade, an arm mounted on the outer side of the casing and laterally reciprocal toward and from the casing, said arm extending outwardly beyond the casing, a grinding wheel rotatably mounted at the outer end of the arm in such position thereon that with the casing mounted on a saw the grinding wheel is disposed in grinding engagement with a saw tooth for rotation in the plane of the tooth, means for rotating said grinding wheel, and means actuated by the wheel rotating means for reciprocating said arm and grinding wheel as a unit to move the grinding wheel back and forth across a tooth during grinding of the tooth by the rotation of the grinding wheel.

18. A saw sharpening machine for removable mounting on a saw to individually sharpen the saw teeth, embodying a casing for mounting at one side of and supported from a saw blade, a stub shaft projecting laterally from the outer side of the casing, an arm slidably mounted on said shaft and extending radially therefrom outwardly across the casing, a rotary grinding wheel mounted on said arm in such position thereon that with the casing mounted on a saw the grinding wheel is disposed in grinding engagement with a saw tooth for rotation in the plane of the tooth, a gear within the casing, means for rotating said gear, transmission mechanism operatively coupling said gear with the grinding wheel for rotating the latter, a cam on said gear opposite said stub shaft, a pin slidably mounted axially on said shaft and connected at its outer end to said arm, and said pin engaged at its inner end by said cam whereby rotation of said gear to rotate the grinding wheel simultaneously reciprocates said arm and grinding wheel laterally as a unit.

Signed at Oxford, county of Granville, State of North Carolina, this 7 day of August, 1930.

LEE M. LOFTIN.